Feb. 24, 1948. J. A. LOGAN 2,436,584
HIGH RATE ACTIVATED SLUDGE PROCESS AND APPARATUS
Filed April 21, 1943 4 Sheets-Sheet 1

INVENTOR.
John A. Logan,
BY

Feb. 24, 1948.  J. A. LOGAN  2,436,584

HIGH RATE ACTIVATED SLUDGE PROCESS AND APPARATUS

Filed April 21, 1943  4 Sheets-Sheet 2

INVENTOR.
John A. Logan,
BY
ATTY

Fig. 5

Patented Feb. 24, 1948

2,436,584

UNITED STATES PATENT OFFICE 2,436,584

HIGH RATE ACTIVATED SLUDGE PROCESS AND APPARATUS

John Alexander Logan, Malden, Mo.

Application April 21, 1943, Serial No. 483,972

18 Claims. (Cl. 210—8)

This invention relates to the purification of sewage and other waste liquors by what is commonly called the activated sludge process.

The general object of this invention is to increase the efficiency of the purification of sewage by the activated sludge process.

Another object is to materially reduce the time required to secure satisfactory sewage purification by the activated sludge process.

A further object is to reduce the amount of air required for treatment of a given quantity of sewage.

Another object is to improve the adsorption of pollute from sewage in activated sludge sewage purification.

A still further object is to provide an improved activated sludge process by means of which the amount of activated sludge required to be wasted is materially reduced or eliminated.

Another object is to provide a highly active sludge for dosing or inoculating raw sewage, and the maintaining of such sludge at a high level of efficiency as shown by such things as the bacterial population curve, the sludge respiration curve, and the like.

Still another object is to provide a method of operating an aeration tank in the activated sludge process of sewage purification to maintain in such aeration tank optimum biologic conditions by controlling the flow of sewage therethrough to a predetermined time cycle related to a bacterial activity period.

A further object is to provide a means for securing a more efficient and more uniform utilization of oxygen along the aeration basin in the activated sludge treatment of sewage.

An additional object of the invention is to provide, in the activated sludge treatment of sewage, for the inoculation of the raw sewage with pollute hungry organisms, that is, to mix such raw sewage with a large volume of sludge at a time when the sludge is in a highly active and efficient condition.

Another object is to provide a method by which the bacterial organisms utilized in the activated sludge purification of sewage are maintained in a condition corresponding to the most favorable portion of the bacterial population curve.

A still further object is to provide a process and apparatus for activated sluge purification of sewage which can be designed to give purification, or B. O. D. removal, at any desired level, and thus introduce a degree of flexibility to the process which it has not previously had whereby the plant can be designed and constructed to meet different purification requirements.

Another object is to produce an activated sludge, in the activated sludge treatment of sewage, which will settle more rapidly than heretofore, thereby reducing the size of the secondary clarification basin required.

Another object of the invention is to provide a method of operating an activated sludge sewage treatment plant so as to maintain high biological activity throughout the aeration basin, whereby the size of apparatus and its cost can be materially reduced.

A particular object is to provide a method of treating sewage with activated sludge wherein there is maintained a cyclic flow through the aeration basin in periods corresponding to cycles of biological activity.

Another object is to provide a method of operating the activated sludge treatment of sewage so as to level up the rate of oxidation curve.

A further object, related to the previous one, is to provide a method of operating the activated sludge treatment of sewage so as to secure a high rate of oxidation throughout the volume or length of the aerating basin.

Still another object is to provide apparatus suitable for carrying out my improved process.

Another object is to provide an apparatus for the activated sludge treatment of sewage wherein there is embodied means for returning definite quantities or proportions of partially treated unclarified sewage from the outlet end of the aeration basin to the inlet end for admixture with entering sewage.

Another object is to provide apparatus for the activated sludge treatment of sewage embodying means for maintaining a definite cyclic passage and repassage of sewage between the inlet and outlet ends of the aeration basin in periods of time corresponding to definite periods of biologic activity.

A specific object is to provide an activated sludge sewage treating apparatus embodying means for maintaining a return flow of sewage undergoing treatment from the outlet end of the aeration basin to the inlet thereof of such volume as to maintain a forward displacement of sewage through the aeration basin in a period of about one hour.

A further object is to provide an activated sludge sewage treating apparatus embodying means for recycling predetermined amounts of mixed liquor from the outlet to the inlet of the aeration basin whereby a controlled biologic gradient is maintained in such basin from the inlet end to the outlet end.

These, and other, objects of the invention will be apparent from the description and claims which follow.

The activated sludge process of sewage purification is approximately 30 years old and in that time has had a very rapid growth, which can be accounted for only because it is one of the most satisfactory methods of treating sewage available. The essential parts of an activated sludge plant are an aeration tank, a final settling tank, and a pump and piping for return of settled sludge from the final settling tank to the inlet of the aeration basin. Many plants have in addition a primary sedimentation or settling tank, sludge digester, reactivation basins and other equipment which are designed to improve the overall efficiency of such a plant. Obviously, all of the various parts of the plant can be of various types and construction.

The basic concept of activated sludge treatment is to mix raw sewage with settled activated sludge accumulated from previous treatment (usually 15 to 30 per cent of the volume of raw sewage), then subjecting the "mixed liquor" (the term usually used to designate the sewage-sludge mixture) to aeration (for a period of about six to eight hours) and then sedimentation (for one to two hours), from which last step the clarified sewage is decanted and settled solids returned for admixing with new sewage. This treatment results in a very great removal of impurities from the liquid, thereby providing an effluent that is suitable for discharge into available water courses. The seeding or inoculation of the sewage to be treated with the returned settled sludge is important, as purification of sewage by simple aeration requires a period of several days. The suspended solids content of the sewage sludge mixture is normally kept at about 2,000 parts per million. After aeration the mixed liquor passes through a settling tank, the effluent being discharged, usually without further treatment, the major portion of solid material settling in the final tank being returned to the inlet of the aeration basin as activated sludge for seeding or inoculating the incoming raw sewage. The process has been considered theoretically as divided into two, and sometimes three, stages: The first, or pollute adsorption stage, during which the pollute from the sewage is transferred to the sludge and the second, or oxidation stage, during which the accumulated pollute is oxidized by the sludge organisms and the sludge reconditioned so that it can again adsorb pollute. A third stage, nitrification, which always occurs to some extent, is not now considered an essential part of the process.

In spite of its impressive growth, there have been objections to the activated sludge process, the most important of which is the cost of operation. The cost of operating an activated sludge plant is considerably more than that of operating a trickling filter or other conventional type of sewage purification because of the power required to aerate and agitate the sewage. Aeration and agitation has generally followed one of two forms, the "diffused air" method in which air is compressed and pumped into the body of mixed liquor, or "mechanical" aeration. In either event the cost of power for aerating the mixed liquor is considerable, especially when we realize that aeration must be accompanied by agitation to prevent sedimentation of solids from the mixed liquor and must be provided, in most cases, during a period of six to eight hours. In either method the rate of oxygen adsorption is low so that the liquid must be contacted with a great excess of air over that required to maintain a sufficient supply of oxygen in solution.

Another disadvantage of the process is that the activated sludge from the conventional activated sludge plant is very light and watery, usually containing about 99.5 per cent water. In most cases about 10 per cent of this sludge is wasted daily. This necessitates a digester capacity in an activated sludge treatment plant of nearly twice that of a trickling filter plant. Another disadvantage resulting from this light activated sludge is the fact that it settles very slowly in the final sedimentation tank, customarily requiring detention periods therein of one to two hours to secure satisfactory reduction in the suspended solids in the effluent.

Another of the drawbacks of the conventional activated sludge process is that it is inflexible in its nature and must be operated at high B. O. D. removal or operating difficulties arise. In other words, in using the conventional activated sludge process there is little permissible variation in the results to be obtained, as it can be designed and operated only for a high degree of purification. This results in high operating cost and thus prevents the use of the process, with its many advantages, in many communities because it is not economical where a moderate degree of purification is satisfactory. It has long been felt that if the activated sludge process could be given greater flexibility in this respect its field of usefulness would be greatly extended.

These defects in the activated sludge treatment have long been recognized, but although much research work has been done and many suggestions made as to means of improving the process, the actual improvements have been few in number. Such suggested improvements have included the flocculation of incoming sewage prior to primary sedimentation, "tapered" aeration, step feeding of sewage to the aeration chamber, and others. However, the length of time provided for aeration has remained constant at about six to eight hours. I have found that by modifying the activated sludge treatment as hereinafter disclosed, I am able to use the whole volume of the aeration basin at full efficiency, and thus secure extremely high purification in periods of about three hours (securing results that are comparable in every respect to the conventional six to eight hour treatment) and I can secure a degree of purification in periods of about one to two hours which is satisfactory for many sewage plants.

I have also found that by the practice of my invention I secure an activated sludge that is more dense and therefore settles more readily than that of the conventional activated sludge plant. I therefore am enabled to reduce the size of the final clarification apparatus, thereby not only reducing its cost but also the cost of land necessary for this purpose. I have also found that the sludge formed in my improved process compacts more readily than that of the conventional activated sludge process, so that even though the same amount of solids is wasted, the digester space required is materially reduced, or sludge dewatering is more easily accomplished.

It has long been realized that the working of the activated sludge process depends on the inoculation of the raw sewage with the returned activated sludge. It has also long been known that within a short period after the mixing of returned activated sludge with the raw sewage most of the pollute has been adsorbed by the sludge. It is also recognized that if the mixed liquor be filtered at this early stage of the treatment, it will be found that there has been a very large reduction of the biochemical oxygen demand (commonly called B. O. D.) which is an accurate indication of pollution removal or purification. Nevertheless, without prolonged periods of aeration, a conventional style plant with its sludge return fails to produce a satisfactory effluent. Also, and perhaps more important, if in a conventional style plant the aeration time is shortened to the time required for pollute adsorption, unsatisfactory sludge is developed therein.

My invention comprises the direct recycling of unclarified mixed liquor from the effluent end of my aeration tank back to the aeration tank inlet in periods conforming to certain biologic activities of the sludge. Heretofore only sedimented sludge from the final clarifying or sedimentation basin has been returned to the inlet of the aeration tank. Recycling, as herein described, means the return of a portion of the liquid being treated, including the suspended solids contained therein, directly from the outlet end of the aeration tank to the inlet thereof for repassage therethrough. I have discovered that by recycling, the load can be pushed further along the tank, thus creating a tendency for the more distant portions of the tank to do as much work as those near the inlet. I have also discovered that this recycling tends to straighten and level the respiration curve and the B. O. D. reduction curve, the amount of straightening depending upon the recycling ratio. I have discovered also that the height of these curves above their base line, that is, the rate of respiration or B. O. D. reduction, may be increased if the recycling is carried out in accordance with principles herein set forth.

Customarily the sludge returned amounts to an average of about 15 to 30 per cent of the raw sewage flow and is taken from a lower portion of the sedimentation chamber after retention periods of from one to two hours, during which time it is obvious that the sludge is stored under non-aerobic conditions and has become somewhat dormant. Thus, the conventional activated sludge process has a six to eight hour detention period in the aeration basin, one or two hours storage in the final clarifier and return of settled sludge from the final clarifier to the aeration basin.

In contrast with this six to eight hour detention period in the aeration tank of the conventional plant, I contemplate with my process, for the same degree of purification, a detention period in my aeration tank of about three hours. In the conventional type plant the sewage is passed once through the aeration tank, flowing across from the inlet to the outlet in the six to eight hour period referred to, the B. O. D. reduction and oxidation being rapid at first and thereafter proceeding very slowly during the remainder of the passage. I cause the sewage to pass across my aeration tank in a period of normally about one hour, and accomplish this by returning sewage from the outlet end of my tank to the inlet end in volume so related to the volume of the tank as to secure the desired pass period. Thus the sewage undergoing aeration flows across my tank a plurality of times.

In my process a distinction is necessary between "detention" period, which is the average period of retention of sewage in the aeration basin, and the "pass" period, which is the time required for one passage through or across the aeration basin. In the conventional activated sludge process the pass period and the detention period are the same.

So far as I know, my method of recirculation has not been used previously and no plant installation has been constructed and placed in service with the idea of working with aeration or detention periods of as low as one, two or three hours. Heretofore all activated sludge plants in service have been constructed on the basic requirement of six to eight hours' aeration and the return of settled sludge from a final sedimentation tank back to the inlet of the aeration tank. In my process the aeration basin can be designed for any desired total detention period of from one hour up and is so operated as to provide the proper pass period by adjusting the volume of return. It is to be understood that in my process the pass period is more fundamental than the total detention period, although of course the latter is also important. It will be noted that in addition to the return of activated sludge from the final clarifier as heretofore known, I also return definite amounts of mixed liquor directly from the outlet end to the inlet end of the aeration basin, without sedimentation or anaerobic storage, for admixture with entering sewage and so increase the amount of sludge mixed with the entering sewage. Thus I am not dependent for the adsorption and oxidation of the pollute upon the more or less dormant sludge returned from the final clarifier but I have also present a large amount of highly active sludge that I have recycled back in the mixed liquor. The presence of more sludge and more active sludge contributes to my improved results.

In connection with the recycling of mixed liquor as above described, I have found that it is usually advantageous to maintain suspended solids at a relatively high concentration. This has heretofore been suggested but the tendency in recent years has been to maintain solids at a minimum figure because of agitation and other difficulties with higher content. The sludge has a natural tendency to adjust its reproduction to the available food supply. It is readily possible in my process to permit the suspended solids to reach their normal maximum concentration, which corresponds to the leveling off of the bacterial population curve, and operation in this manner avoids the necessity of discharging sludge. As shown in the diagrams to be discussed hereafter, purification is somewhat dependent upon the concentration of solids so that in my process it becomes advisable to maintain the suspended solids, and thus the sludge population, in the mixed liquor at high figures although this is not necessary.

The invention will be more fully understood by reference to the drawings, which form a part hereof and in which like reference characters designate similar elements in the respective figures.

Figure 1:
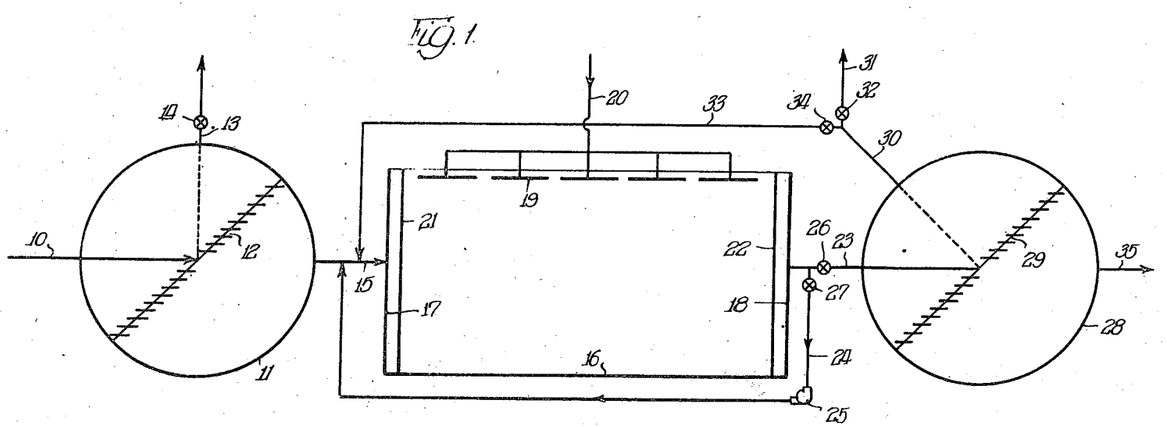
Figure 1 is a plan view in the form of a flow diagram of one form of my sewage treatment apparatus based upon the diffused air type of treatment.

Referring to Figure 1 it will be seen that the sewage treatment plant comprises a raw sewage inlet conduit 10 which may include such conventional equipment as grit chambers, screens, grease removal apparatus, flocculating equipment and the like, not shown. The raw sewage inlet 10 preferably will discharge into a conventional primary clarifier 11, equipped with a mechanism 12 for raking sludge toward an outlet conduit 13, which is provided with suitable valve means 14. It will be understood that the primary clarifier can be entirely eliminated, as is done in some activated sludge plants, or may, under certain conditions, be bypassed with a suitable bypass conduit, not shown.

Clarified sewage from the primary clarifier 11, or the raw sewage in the event it is not first clarified, will pass through an aerator feed conduit 15 into an aeration basin 16. Normally this basin will be a rectangular chamber several times as long as it is wide or deep. Ordinarily sewage is introduced into an inlet end 17 and withdrawn at the opposite, or outlet end 18. Sewage in the basin is aerated from diffusers 19, which may be placed either along one wall of the basin, or down the center thereof, in order to provide a spiral flow of the sewage undergoing treatment as it is being progressively displaced from the inlet end 17 to the outlet end 18. Diffusers 19 can be supplied with air by any suitable means such as a pipe 20 and an air compressor, not shown.

A uniform forward displacement of mixed liquor through the aeration basin is necessary for optimum results. Such displacement is desired in order to prevent short circuiting of flow through the basin so that all of the contents will be sure to have a pass period through the aeration basin substantially that of the average. As will be more fully explained hereafter, optimum results under my process are obtained when the length of pass period is based upon bacterial activity. Thus to control recycling and pass periods as uniformly and closely as possible to such biologic activity, it is desirable that the flow through the aeration basin be a uniform displacement of liquid from inlet to outlet of the basin. For this reason, I prefer to provide means in the aeration basin to avoid short circuiting and to provide a uniform forward displacement throughout the whole cross-sectional area of the basin 16, such as distributing baffles, preferably slotted or perforated, or the like, 21 and 22, located adjacent the inlet and outlet ends 17 and 18, respectively. The object of the distributing baffle 21 at the inlet end is to distribute the flow throughout the cross-sectional area of the tank, and the baffle 22 at the other end to pick up the flow in the same manner.

An aerator, or mixed liquor, effluent pipe 23, leads from the outlet end 18 of the aeration chamber 16 to a final, or secondary sedimentation chamber 28, as in the conventional activated sludge plant. However, as shown, in the plant of my improved process, I also provide a mixed liquor return conduit 24 to return unclarified mixed liquor taken immediately after discharge from the aeration chamber 16 to the inlet end 17, thereof, either directly or through the aerator inlet conduit 15, as shown. The return flow conduit 24 should be provided with a suitable pump 25 to return mixed liquor from the outlet end to the inlet end of the aeration basin. The mixed liquor return conduit 24 may branch from the aerator effluent conduit 23, as shown, or may have a separate communication with the outlet end of the aerator basin. The amount of liquid recirculated through the mixed liquor return conduit 24 can be controlled by suitable valves such as 26 and 27 on the effluent conduit 23 and the mixed liquor return conduit 24, respectively. Preferably the mixed liquor return conduit 24 and the pump 25, which latter may be of either fixed or variable capacity, will be of such size as to return to the influent end 17 of the aerator a quantity of mixed liquor at least equal to the average inflow of raw sewage, the proportion of return depending on the total detention period and degree of purification desired. Preferably, for normal purification, the volume of the aerator basin should be about three times the volume of the normal hourly flow of sewage, and the pump and return conduit will be designed to return each hour a volume of about two or three times the average hourly inflow of raw sewage.

A flow of mixed liquor equal to the input into the aerator 16 is passed into a final clarifier or final sedimentation basin 28 which is preferably provided with suitable sludge raking mechanism 29, adapted to move settled sludge to a suitable outlet. Settled sludge is withdrawn from the final clarification chamber 28 through a sludge outlet conduit 30, which may branch, as shown, into a waste activated sludge conduit 31 and a return sludge conduit 33 provided with suitable valve means, such as 32 and 34, respectively. The return sludge conduit 33 will ordinarily discharge into the inlet end 17 of the aeration basin 16 or into the sewage influent pipe 15 which discharges thereinto. Clarified liquid will be discharged from the final clarifier 28 through a sewage effluent line 35.

Figure 2:
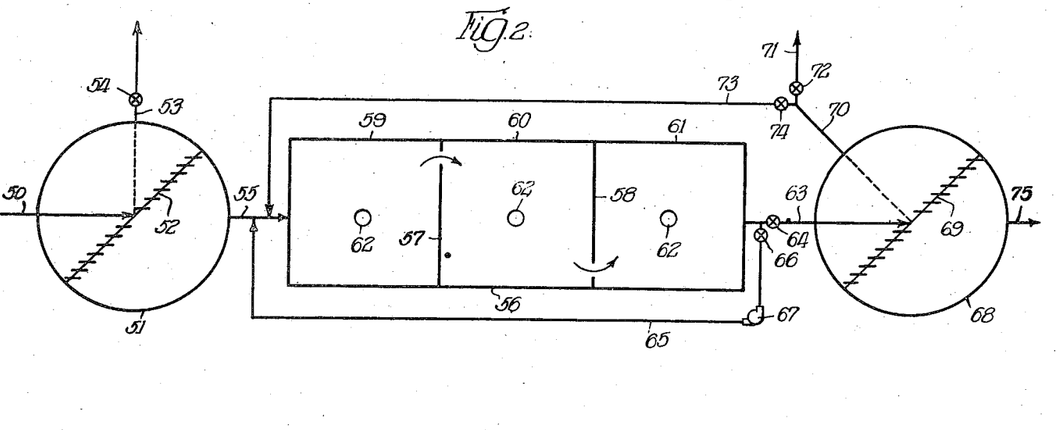
Figure 2 is a similar plan view of my activated sludge treatment apparatus utilizing mechanical aerators instead of diffused air.

In the plant illustrated in Figure 2, raw sewage, which may have been pretreated by any suitable means, enters the plant through a sewage influent conduit 50. Preferably the sewage will be subjected to a primary clarification step in a primary settling basin 51 equipped with a sludge raking mechanism 52, a clarified liquid effluent 55, and a sludge outlet conduit 53, flow through which is controlled by a valve 54. However, if desired, as it is in some plants, the preliminary clarification step can be omitted or sometimes bypassed.

The aerator apparatus 56, shown in Figure 2, illustrates the application of my invention to the mechanical aeration type of plant. In such a plant the aeration apparatus comprises a plurality of small basins or a large basin, as shown, divided, as by suitable partitions, such as 57 and 58, into a number of aeration basins 59, 60 and 61, respectively. Each of the aeration basins is provided with a mechanical aerator 62 of well known type, which may spray sewage over the surface of the liquid in the respective chamber, or otherwise aerate and agitate the sewage therein. In such a treatment the sewage is aerated in the plurality of aerating and agitating chambers in sequence, in order to prevent short circuiting as much as possible. In such a structure the first chamber 59 can be spoken of as the influent or inlet zone of the aeration chamber and the final aerating chamber 61 can be spoken of as the outlet or effluent zone of the aeration basin.

An aerated effluent conduit 63, equipped with a suitable valve 64, and the mixed liquor return conduit 65, equipped with valve 66, will lead aerated liquid from the final chamber 61—the first to a secondary or final clarifier 68 and the latter to the inlet chamber 59, either directly or by discharging into the clarified sewage inlet conduit 55, as shown. The mixed liquor return flow line will be equipped with some suitable flow creating means, such as pump 67.

The mixed liquor not recycled, being an amount equal to the input, will pass through the aerator effluent conduit 63 into the final clarifier 68 for sedimentation of solids therein. The final clarifier 68, preferably is provided with a sludge raking mechanism 69 which moves solids settling on the floor thereof to a sludge outlet conduit 70. The sludge outlet conduit 70 may be branched as shown to provide a waste conduit 71 flow through which is controlled by valve 72, and a return sludge conduit 73 provided with valve 74. The return sludge may be returned either directly into the inlet chamber 59 or into the clarified raw sewage inlet 55 discharging thereinto. A sewage effluent conduit 75 will discharge treated sewage from the final clarifier 68.

Figure 3:
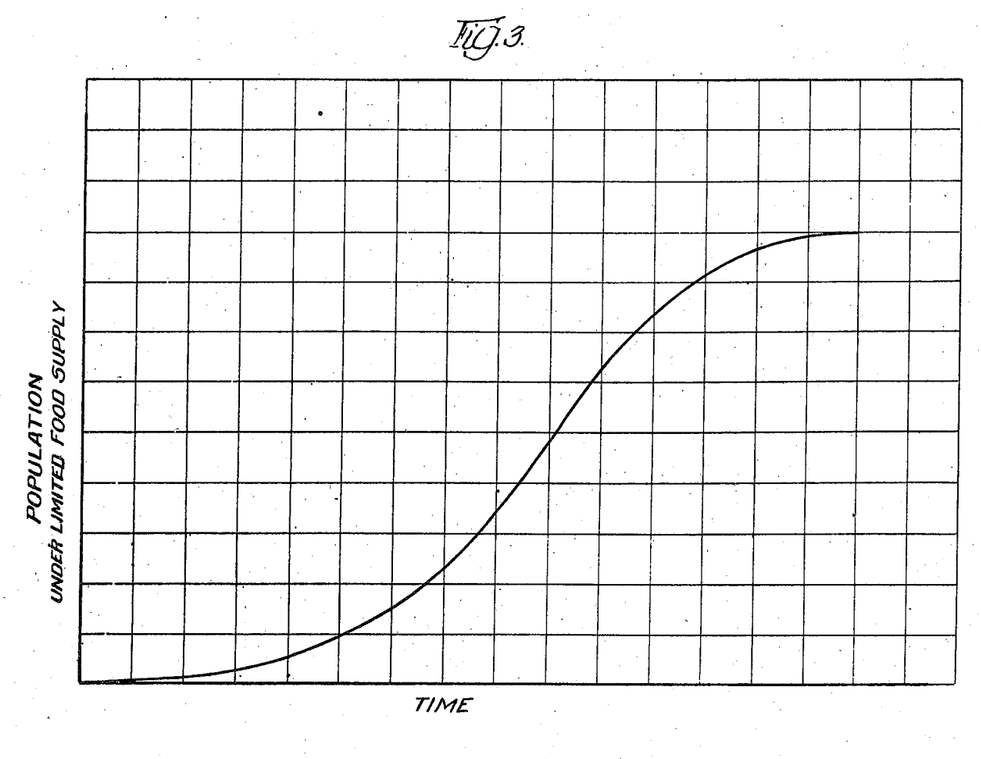
Figure 3 represents a theoretical bacterial population curve.

The curve of Figure 3 represents a theoretical bacterial population curve which, however, is quite typical. The curve may change slightly due to the types of bacteria and the time required for their life cycle, and its height will depend upon the amount of food available for the bacteria. It is assumed that the bacteria are aerobic and that a sufficient quantity of air is supplied to maintain active bacterial life—which condition is always found in an activated sludge plant. The bacterial population curve is not new and is not claimed herein, but I do use it for control of plant operation in a manner which I believe to be new. It will be seen that the population increases gradually until the bacteria have become established and then rises very sharply until the population approaches the upper limit, which is fixed by the amount of food available. The curve then levels off and remains substantially constant thereafter. I have found that while the population at the upper limit remains substantially constant under any given condition, this does not indicate that the formation of new organisms does not take place. It means only that "births" and "deaths" are equalized. At this level, there is an autolysis, or self-digestion, of the sludge which permits young and active organisms to divide and multiply and the old organisms to die and be digested by the younger, so that the bacterial population remains active and constant in number. If the concentration of suspended solids in the sludge is maintained at this portion of the bacterial population curve no sludge need be discharged to waste. I have found that with the recycling herein proposed it is, under ordinary conditions, entirely feasible to return all of the sludge from the final clarifier back to the aerator and to completely avoid wasting activated sludge. It is true however that bacteria show most activity when conditions are such that the population curve is in its portion of sharpest rise. At this stage the bacteria are multiplying most rapidly and can be considered as most pollute hungry. If the bacterial population is maintained in a condition corresponding to this portion of the curve, purification by adsorption and oxidation will be most rapid and efficient but this advantage is somewhat offset by the necessity of continuously wasting sludge. With my system it is feasible to operate the plant in either one of the ranges shown and described, and satisfactory results still be secured. I have found that the bacterial population can be maintained at any desired figure or at any desired portion of the population curve by the controlled wasting of sludge. Pilot plant operation, using my recycling, proved that if no sludge was wasted the bacterial population would reach a figure somewhat higher than heretofore accepted as satisfactory and would then remain fairly constant. Long runs in the pilot plant under the various types of recycling hereinafter mentioned showed that purification with such high concentrations of suspended solids was very efficient and satisfactory. However, it is believed preferable in most cases to provide for wasting some sludge if abnormal conditions arise.

I have also discovered that in my process even with the use of a high solids concentration there is produced a compact and healthy sludge, which gives excellent purification results without bulking. In a plant operating under my process the cost of operation with high solids concentrations is not materially greater than when using low concentrations. It is therefore possible to operate my plant and process over a wide range of sludge concentrations.

Figure 4:
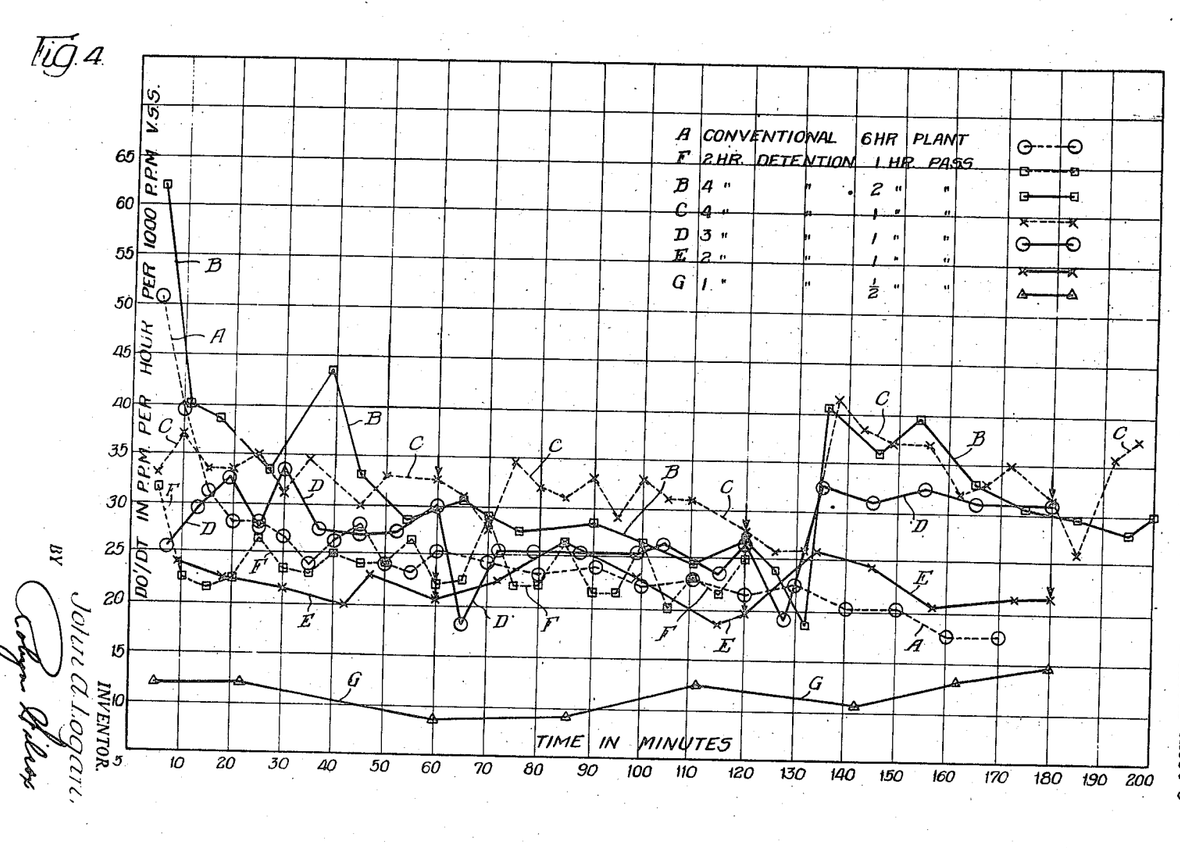
Figure 4 is a chart showing the respiration curve of sewage during the conventional activated sludge treatment and through six different pilot plant runs of various detention periods and passes.
Figure 5:
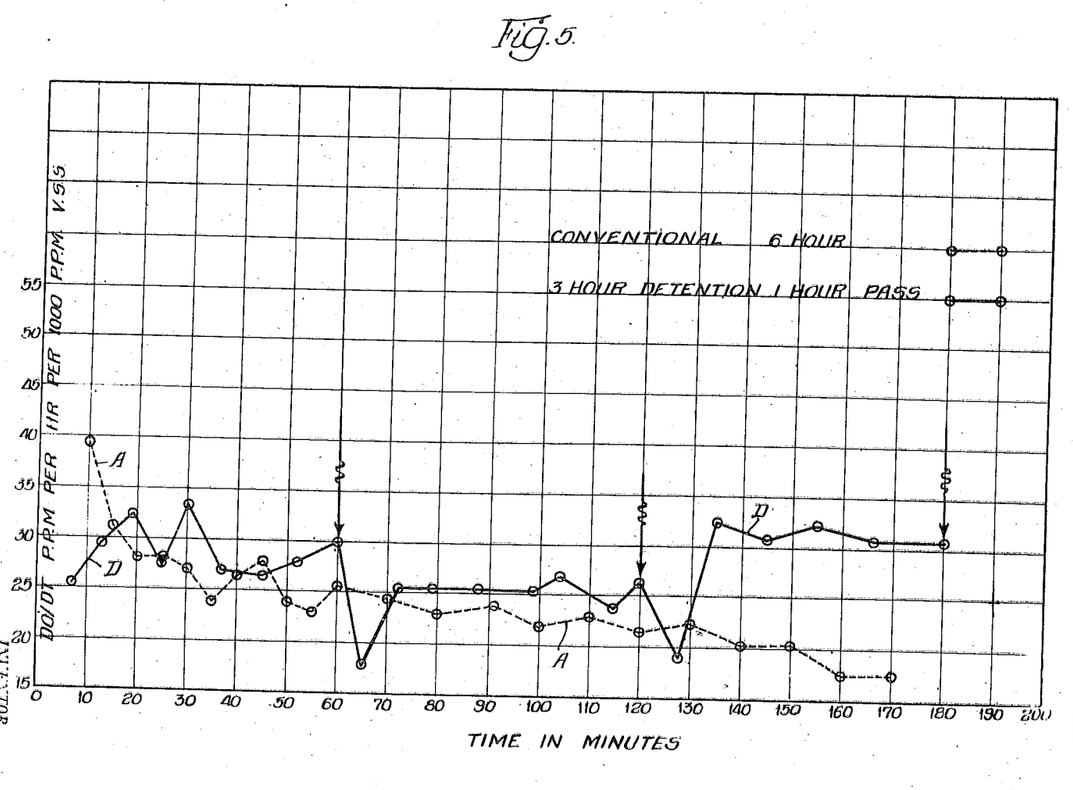
Figure 5 is another chart showing a respiration curve from the conventional six hour activated sludge process, and a curve from my preferred method of operating on a three hour detention period with one hour passes, both curves taken from Figure 4.

Figures 4 and 5 show respiration curves under my process, which are accurate indications of sludge activity and efficiency. I have found that respirometer curves, showing the rate of oxygen utilization (respiration) of the sludge in the aeration basin, correspond in general to the rate of B. O. D. reduction. Respiration, or oxygen utilization, curves show directly the activity or metabolism of the sludge. Indirectly they show the rate of purification of sewage. Thus it is possible, under normal conditions and within reasonable limits to gauge purification by the respiration curves. Data for these curves is more easily obtained than 5-day B. O. D. determinations so that for the purposes of this specification the respirometer curves will be used in place of the more familiar B. O. D. determinations. Oxygen utilization is generally expressed as parts per million of oxygen per hour per liter of mixed liquor, or as parts per million of oxygen per hour per liter of mixed liquor per thousand parts per million of volatile suspended solids, the latter being known as the $$\frac{do'}{dt}$$

curve. The latter has been used in the figures showing oxygen utilization, and all values thereon have been so computed.

Figure 4 shows the curve of a conventional activated sludge plant (line A) together with those obtained from different pass and detention periods under my invention. Each curve represents averages of pilot plant operations extending over periods of several weeks, as follows:

4 hour detention and 2 hour passes (line B)
4 hour detention and 1 hour passes (line C)
3 hour detention and 1 hour passes (line D)
2 hour detention and 1 hour passes, with the conventional amount of suspended solids in the mixed liquor (line E)
2 hour detention and 1 hour passes, with approximately double the customary amount of suspended solids in the mixed liquor (line F)

1 hour detention with ½ hour passes (line G)

All of these tests were performed in a pilot plant operated on a continuous basis and under similar conditions. The sewage used in pilot plant operation varied from 86 to 236 parts per million, 5-day B. O. D., when applied to the aerator, which covers a wider range than is found in most American sewage.

Figure 5 is the same as Figure 4 except that it shows only two of these curves: A (conventional activated sludge treatment) and D (three hour detention with one hour passes), the actual B. O. D. reductions in the two cases being comparable. These curves contrast the efficiency of conventional operation and my new treatment.

From the point of view of oxygen utilization the primary object is to straighten out and raise the respiration curve so that there will be uniform and high utilization of oxygen throughout the whole period of aeration. Another way of expressing the objective of leveling and raising the respiration curve is to say that with a high and level rate of respiration or metabolism the period required for purification is shortened.

The respiration curve A in Figures 4 and 5 is typical of the first few hours aeration in a conventional activated sludge process and shows the continual decline to a low rate, the drop being rapid at first. In practice this curve continues at this low rate, or lower, to the end of the aeration period. In the chart of Figure 4 it is readily seen that with the exception of line G, which represents the very short period of one hour detention with one-half hour passes, the various periods of detention and of pass give curves that are quite close together. Curves B and C, which represent four hour detention, give consistently better results than the conventional six hour method, and show more uniform and higher activity on the part of the sludge. This is particularly pronounced in the four hour detention with one hour passes (line C), which is much more level than line B or line A. Line D, representing three hour detention with one hour passes, is a level curve indicating rapid utilization of oxygen. This period of recycling gave a percentage of purification equal to the conventional six hour detention and comparable to those secured by my four hour detention. This run gave an average purification of about 95 per cent, which represents excellent results in any plant. The results shown by curve E and F (two hour detention with one hour passes) are somewhat lower than those of B C and D but sufficiently high to be acceptable for most sewage treatment plants. The only difference between curves E and F is that F, which represents a concentration of suspended solids approximately twice that usually carried in conventional activated sludge plants, has respiration rates that are slightly superior to those of curve E, which represents the normal amount of suspended solids. Line G represents the curve of one hour detention with one-half hour passes and is considerably lower than those utilizing one hour passes and longer detention, but is sufficiently high to be acceptable in a number of plants as it represents approximately 85 per cent purification. This chart shows the high activity obtained with my process.

An outstanding feature of my tests was the unexpected high B. O. D. reduction at all detention periods. However it was found that with passes of one-half hour the purification is less complete, and the rate of oxygen utilization is much lower, than with pass periods of about an hour. Also, and particularly with detention periods of two and three hours, my recycling showed its advantages. It will be appreciated that the data here given illustrates the flexibility of my process and the possibility of designing activated sludge plants operating under my process to secure a desired lower degree of purification, something that has proven impossible with the conventional activated sludge process.

It is believed that the operation of my plant and process will be readily understood. Raw sewage, which may have been subjected to preliminary treatment such as grit and grease removal, chemical flocculation, etc., will usually be subjected to sedimentation in a primary clarifier, 11 or 51, to remove the bulk of suspended solids. However, in many plants treating uniformly weak sewage, the primary clarification step is not necessary. My pilot plant operation, using a sewage of higher than usual strength, gave consistently good results. The sewage is introduced into the aerator, 16 or 59, and there mixed with sludge returned from the final clarification basin, 28 or 68, and also with an amount of mixed liquor taken from the effluent end of the aerator basin. The incoming raw sewage should be thoroughly mixed with the return sludge and the returned mixed liquor. Heretofore it has been considered unwise to subject the return sludge to violent agitation. My experiments have shown that when combined with recycling as herein described, violent agitation of the activated sludge floc is not detrimental.

As indicated above, it is preferred that the volume of the aeration basin should be about three or four times the volume of the normal hourly flow of sewage, in which event the pump and return conduit should be designed to return each hour a volume of about two or three times the average hourly inflow of raw sewage. However, the ratio of return of aerated mixed liquor to the inflow of raw sewage, while preferably two or three to one, may vary over a considerably wider range as shown by the curves of Figures 4 and 5. Ordinarily it will not be desirable to return less than an equal volume of mixed liquor, or a 1 to 1, ratio, nor would it be economical to return more than six or seven parts of mixed liquor to one of untreated sewage (a ratio of 6 or 7 to 1). To the same general effect is the ratio of the normal pass period to the normal total detention time. This ratio however, for equal flows, will obviously be slightly different from the ratio between the return of mixed liquor and inflow of incoming sewage to be treated. For example, a return of mixed liquor in an amount equal to the normal rate of inflow of sewage to be treated (1 to 1 ratio of return) will give a total detention time of twice the length of the pass period, or a ratio of 2 to 1, and similarly a total detention time of four hours and a pass period of thirty minutes would give a ratio of 8 to 1. For simplicity no reference has been made in the preceding to the effect of the returned sludge on volumes, times or ratios. This effect is not geat and in practice is readily allowed for if desired.

The length of pass has herein often been spoken of as of the order of about one hour. It will be understood, however, that the time measurement is a secondary one and that the actual period of a pass or length of a cycle is based upon a cycle of bacterial activity, that is, the length of the cycle should be that required for pollute adsorption, leveling up of the respiration rate or oxygen utilization curve, or other indicia of activity. I have found that all of these indices of activity point to about the same desirable cyclic period. I have discovered that if, instead of carrying out the activated sludge process as heretofore done in the conventional type plant, there is established a definite and controlled recycling of mixed liquor with periods of pass between the inlet and outlet ends of the aeration basin, corresponding to such cycles of biologic activity there is, among other things, a substantial increase in the rate of oxidation and the time required for purification is substantially reduced. It is, therefore, of the essence of my invention to recycle the mixed liquor, that is sewage undergoing treatment and containing active sludge, from the outlet end of the treatment basin to the inlet end thereof in periods determined from and based upon cycles of such biologic activity. These periods may vary under different conditions such as character of sewage, temperature, etc. When the period is expressed in terms of time, this is to be understood as indicating the period allowed for duration of a pass from inlet end to outlet end, that is, the period allowed for a biologic cycle. Frequently these cycles of bacterial or sludge activity are less than one hour but I have spoken of and in practice prefer a pass of about one hour because this provides a safety factor for occasional overload or some short circuiting within the basin or other unavoidable defects of apparatus while at the same time there is little if any decline of activity with this pass period. It must be understood that a pass period is based upon the average, or normal, rate of flow and that the actual pass period will vary somewhat with variations in input, although with proper recycling these variations are not great as they tend to even out. Viewed from another aspect it might be stated that the amount of mixed liquor to be recycled is such as to maintain the time of each passage of the mixed liquor across the aeration basin within prescribed limits even though the volume of entering sewage varies, that is, the time of passage is to be held within the limits imposed by the periods of bacterial activity spoken of. It is, of course, possible to operate my process with pass periods of more than an hour; and this may sometimes be desirable although in general it may necessitate a longer detention period with increased size of tank. It will also be apparent that while generally the ratio of return is given as the ratio between mixed liquor and incoming sewage to be treated, the ratio between the return of freshly aerated sludge, which is contained in mixed liquor, and the return of separated sludge from the secondary clarifier to the aeration basin, will be substantially the same as the amount of sludge to be wasted is so small as to be disregarded. Obviously, operation on the basis of two passes (as in lines E, F, G) requires dividing the aerator effluent into two equal portions, one being returned to the aerator and one going to the secondary clarifier. Such operation will therefore be at the ratio between separated sludge and freshly aerated sludge of 1 to 1. Similarly, the ratio on the basis of three passes will be 2 to 1 and on the basis of four passes will be 3 to 1. Also, the ratio on the basis of four hours detention with one-half hour passes would be 7 to 1.

I can secure a very high degree of purification in a very short time, as shown in the table below, which gives averages of daily results of the runs shown in Figure 4.

| Run No. | Suspended Solids | | 5-Day 20° C. B. O. D. | | |
|---|---|---|---|---|---|
| | P. P. M. in mixed liquor | Percent Volatile | Raw Sewage | Pilot Plant Effluent after 60 minute settling | Percent Reduction— Pilot Plant Effluent with 60 minute settling |
| G | 3,135 | 81.4 | 169 | 19.9 | 87.0 |
| E | 2,226 | 80.9 | 160 | 12.3 | 91.6 |
| F | 3,837 | | 167 | 22.8 | 85.2 |
| D | 1,679 | 82.5 | 236 | 12.8 | 93.9 |
| C | 1,722 | 79.5 | 127 | 14.1 | 89.4 |
| B | 1,364 | 78.9 | 86 | 10.8 | 84.1 |

It is evident that in my process I seed or inoculate the raw sewage with a large quantity of sludge carried in mixed liquor as well as a normal volume of activated sludge coming from the final clarifier. For some reason, not now understood, the sludge developed in my process is considerably more dense than the usual activated sludge, and therefore will settle more rapidly. The sludge from the final clarifier, some of which it may be necessary to waste, will be found to be much more compact than the conventional sludge so that digester volume may be considerably reduced in my type of plant. Also, as shown above, by operating with a high concentration of suspended solids, very satisfactory purification can be secured and it becomes unnecessary, over long periods of time, to discharge sludge to waste.

As shown in the curves of Figures 4 and 5, a pass period on one hour gave better results than either the shorter or longer pass periods. A reason for these results is apparently that the periodic feeding of activated sludge with incoming sewage at intervals of about an hour by recycling mixed liquor, develops an exceedingly active and pollute hungry sludge which rapidly adsorbs the pollute from the sewage and which when thoroughly aerated during the pass period, rapidly oxidizes what it has adsorbed and is again ready for food. In the conventional system, sludge from the final clarifier is fed at intervals ranging from 7 to 10 hours, and is then held in the aeration basin for a long period during which it receives no new food, and finally for an additional period of about two hours in the final clarifier under anaerobic conditions. During this latter period the sludge becomes somewhat dormant. As stated above, I have found that the activities of the sludge depend upon properly spaced intervals of feeding, and my best results were secured with intervals of about one hour. It is for this reason that the controlled recycling, or controlled length of pass period, is so important. It also explains the necessity of a uniform forward displacement of sewage through the aeration basin.

It is believed that recycling of mixed liquor as herein proposed establishes what might be called a favorable biological gradient of the sludge and this is accompanied by a leveling up of the oxygen utilization curve, making the process much more rapid and efficient. It is also apparent that the recycling of mixed liquor as proposed increases the efficiency of the activated sludge purification of sewage, materially reducing the time required for satisfactory purification and thereby reducing the size and cost of the plant and cost of operation.

It is obvious that by taking advantage of the increased efficiency that can be obtained by my leveling of the B. O. D. removal or respiration curves, with simultaneous reactivation through recycling of mixed liquor, it is possible to greatly reduce the normal six to eight hour aeration period of the conventional activated sludge process. It is clear that cutting down the period of aeration from six to eight to three hours results in a radical reduction in the amount of air required for treatment. Apparently the activated sludge formed in my process is more active and has increased pollute adsorption and oxidation capacity over that produced in the conventional plant. The practical results of my findings make it possible to operate at high rates of flow and shorter detention periods and still secure a high B. O. D. reduction, or to further speed up the process and obtain a lesser reduction which would be entirely satisfactory for many installations. It will also be evident that my process permits a flexibility of design of activated sludge plants, based upon the amount of purification desired, which was heretofore impossible.

My recycling is not to be confused with the general diffusing and mixing that takes place throughout the volume of the aeration basin in some conventional type plants. In such plants there is a continuous circulation during aeration in which the liquid is drawn from and distributed again to all parts of the basin. With this type of circulation and aeration it has not been found possible to reduce the total detention time, but instead, when the areation is carried out in a single basin, it has been the practice to lengthen it. In my process I desire to avoid such diffuse circulation. I propose instead to establish definite flow conditions. I propose a controlled recycling in which the forward pass from inlet to outlet is uniform and progressive in nature in definite periods and in which the return flow of predetermined amounts is taken from near the outlet and delivered back adjacent the inlet. In this way I establish a definite cycle and gradient of conditions of predetermined length and it is to this control and these conditions I largely attribute my improved result. It is to be noted that while I speak of cycles and periods and recycling in connection with my aeration basin,.that my process is a continuous one wherein raw or unpurified sewage continuously enters at the inlet end and treated sewage continuously discharges at the outlet end and is continuously aerated while in the basin.

It will be understood that the descriptions and examples given above are intended for purposes of illustration and exemplification and not for limitation. It will be apparent to those skilled in this art that the principle of controlled recycling that I have discovered and herein disclosed can be applied in various ways. The period of recycling is rigid only to the extent that the closer it conforms to the cycles of biologic activity the more fully will the advantages of my invention and teaching be realized. It is not necessary to conform closely to the biologic time cycle to secure great advantages from my process and, as mentioned hereinbefore, I contemplate allowances for inefficiencies of apparatus, etc. Only on a gross departure from the principles set forth will there be failure to secure benefit therefrom. Likewise I contemplate various forms of apparatus or structure of apparatus in my invention, but all of these must embody the feature that there is included means for the recycling of the mixed liquor from the outlet end of the aeration basin back to the inlet end thereof, as well as means for separating the sludge from the effluent from the aeration basin and return of such sludge back into the aeration basin. Particular arrangements and forms adapted to meet different conditions, such as volume and nature of sewage to be treated, nature of the terrain where the plant is located, etc., will become apparent to those skilled in the art upon considering this disclosure. A primary clarifier may or may not be used; the return sludge from the final clarifier may be separately reactivated if desired; the incoming sewage may be fed into the aerator at separated points; the return sludge or recycled mixed liquor can be fed into the aerator at separated points; excess sludge can be wasted directly from the clarifier or by any other suitable means, such as return to the primary clarifier as heretofore known; the effluent from the final clarifier may be filtered before discharge; "tapered" aeration used, and the like.

I claim:

1. The treatment of sewage with activated sludge that comprises mixing entering sewage and active sludge separated from previously treated sewage, progressively passing the mixed liquor so formed across an aeration zone, aerating said mixed liquor in said aeration zone, withdrawing a portion of the aerated mixed liquor, separating sludge therefrom to form the source from which said activated sludge is taken, discharging the clarified liquor to waste, and returning separated sludge to the aeration zone and also withdrawing from a downstream section of the aeration zone and returning to an upstream section thereof a quantity of freshly aerated mixed liquor, the quantity of mixed liquor returned being such as to carry an amount of activated sludge ranging from about one to about four times the amount of returned separated sludge, and mixing the returned mixed liquor with entering polute carrying sewage.

2. A process of treating sewage with activated sludge that comprises mixing the sewage entering the inlet portion of an aeration zone having a capacity of about three times the hourly input of sewage with controlled quantities of sewage solids from two sources, one quantity comprising settled solids separated from sewage being discharged to waste from the aeration zone and another quantity comprising an amount of unsedimented solids equal to about twice the amount of settled solids, said unsedimented solids being obtained by continuously returning to the inlet portion of the aeration zone for further treatment a controlled amount of unclarified sewage taken from the outlet portion of said zone, and progressively aerating the mixture across said aeration zone from said inlet portion to said outlet portion.

3. In a process of treating sewage with activated sludge wherein the entering sewage is delivered into a near end and discharged from a far end of a longitudinally extending treatment zone and progressively aerated during passage through said zone, aerated sewage discharged from the far end of said zone into a subsidence zone at the rate of entry into the treatment zone, clarified sewage discharged from said subsidence zone to waste, and sludge returned from said subsidence zone to the near end of said treatment zone, the improvement that comprises withdrawing an amount of unclarified aerated sewage from the far end of said treatment zone, and reintroducing the same into the near end thereof, said amount being sufficient to maintain the ratio of the normal total detention time of sewage in the treatment zone to a pass period through said zone within the range of from about two to one to about six to one.

4. The activated sludge process of treating sewage which comprises the old steps of passing the sewage through an aeration zone having an influent zone and an effluent zone therein, progressively aerating sewage passing from said influent to said effluent zone, clarifying aerated sewage, returning sludge separated from clarified sewage to the aeration zone and discharging the clarified sewage to waste, and the new step of continuously inoculating the incoming sewage in the influent zone with a quantity of unclarified aerated sewage withdrawn from the aerator effluent zone and reintroduced into the aerator influent zone from about two to about four times the quantity of incoming sewage.

5. An activated sludge process of treating sewage which includes passing the sewage forwardly through an aeration zone having an influent zone and an effluent zone therein, clarifying aerated sewage, returning separated sludge to said aeration zone and discharging the clarified sewage to waste, characterized by repeatedly passing sewage through said aeration zone and subjecting it to aeration therein for predetermined periods during such successive passages across said zone, the duration of said passages being controlled by the return of a quantity of aerated and unclarified sewage taken from the effluent zone and discharged into the influent zone for repassage therethrough ranging from about one to about seven times the flow of sewage to be treated.

6. The method of aerating sewage in an activated sludge sewage treatment plant which comprises subjecting the sewage to a plurality of passes through the aeration zone and controlling the time required for one pass through the aeration zone of the normal amount of sewage entering to be treated to correspond with the period of high oxygen utilization by the sludge in the aeration zone by discharging sewage and contained solids from the outlet of the aeration zone after treatment therein for a period corresponding to such period of high oxygen utilization, and mixing the same with the sewage entering said aeration zone to be treated, the amount of such returned sewage being such that the sewage passing into said aeration zone is recycled therethrough at least once in passes of such controlled duration.

7. The method of treating sewage by the activated sludge process which includes the steps of passing raw sewage through a first sedimentation step, withdrawing deposited solids from said sedimentation step to waste, progressively passing the settled sewage through an aeration step, aerating the sewage during passage through said aeration step, continuously returning unclarified aerated sewage leaving the aeration step to incoming settled sewage for admixture therewith and repassage through the aeration step in an amount about twice the normal rate of entry of sewage, passing the balance of the aerated sewage leaving the aeration step through a second sedimentation step, withdrawing clarified liquid from said second sedimentation step to waste, and returning sludge deposited in the second sedimentation step to the aeration step.

8. In the activated sludge process wherein the sewage is aerated during progressive passage through an aeration zone and the sludge solids separated therefrom in a subsequent clarification zone, the improvement which comprises seeding raw sewage entering the aeration zone with an amount of aerated liquor containing fresh active sludge recycled directly from the outlet portion of said aeration zone within the range from about one to about six times the normal inflow of sewage to be treated and with dormant sludge from the clarification zone.

9. In a process of treating sewage with activated sludge wherein the entering sewage is delivered into an inlet end and discharged from an outlet end of a longitudinally extending aeration zone of a size sufficient to hold a volume of sewage equal to two to four times the average rate of hourly input and is progressively aerated during passage through said zone, aerated sewage is discharged from the outlet end of said zone into a clarification zone at the rate of entry of sewage to be treated into the aeration zone, clarified sewage is discharged from said clarification zone to waste and sludge returned from said clarification zone to the inlet end of the aeration zone, the improvement that comprises returning an amount of unclarified aerated sewage from the outlet end of said aeration zone to the inlet end thereof sufficient to maintain the time of each passage of sewage undergoing treatment through said aeration zone within the range of from about one half hour to about two hours.

10. In the activated sludge process wherein incoming sewage to be treated is mixed with sludge formed in previously treated sewage, the mixture is aerated during progressive passage through an aeration zone, and solids are separated from the aerated sewage in a clarification zone to form the sludge mixed with incoming sewage to be treated, an improved method of maintaining a high rate of sludge activity which comprises the steps of aerating the mixture in the aeration zone for a predetermined period of from about one-half hour to about two hours, then passing only from about one-half to about one-eighth of the so aerated sewage to the clarification zone, and returning the balance of such aerated sewage, after undergoing aeration for such predetermined period, to the incoming sewage to be treated and said sludge for admixture therewith and recycling through the aeration zone.

11. A plant for the treatment of sewage by activated sludge comprising an elongated basin having inlet means for raw sewage and activated sludge at one end and an outlet for aerated sewage from the opposite end, said basin being of such size as to hold a volume of sewage equal to about three times the average rate of hourly input, means to aerate the sewage during passage through said basin, and means for recycling unclarified aerated sewage from the outlet end of said basin to the inlet end thereof at the rate of about twice the average rate of input.

12. A plant for the treatment of sewage by the activated sludge process comprising an elongated aeration basin having an inlet for raw sewage and activated sludge at one end and an outlet for mixed liquor from the opposite end, said basin being of such size as to hold a volume of mixed liquor within the range of from about two to about four times the average rate of hourly input, means for aerating sewage in said basin, and means including a passageway leading from the outlet end of said basin to the inlet end thereof, said means being of such type and size as to be capable of continuously returning a quantity of mixed liquor at least equal to about the normal rate of sewage input.

13. In a system for an activated sludge sewage treatment comprising a first clarifier, an aeration tank having an inlet section adjacent one end and a downstream section leading to the other end an aerator in said aeration tank. and a second clarifier, a raw sewage inlet conduit discharging into said first clarifier, a clarified sewage conduit leading from said first clarifier to the inlet section of said aeration tank a settled solids outlet conduit leading from said first clarifier, a conduit means for mixed liquor leading from the downstream section of said aeration tank to said second clarifier, clarified liquid withdrawal means leading from said second clarifier and a solids outlet conduit leading from said second clarifier and discharging into the inlet section of said aeration tank: the combination with said aeration tank of an outlet leading from the downstream section thereof and discharging into the inlet section thereof and a pump associated with said outlet, said outlet and said pump being of such size as to continuously return a quantity of mixed liquor from the downstream section of the aeration tank to the inlet section thereof at least about the normal input of the raw sewage, whereby a major portion of the mixed liquor may be recycled through said aeration tank.

14. Apparatus for the treatment of sewage by the activated sludge process comprising an aeration basin having an inlet portion and an outlet portion and of such size as to contain an amount of sewage ranging from about two to about four times the average hourly rate of sewage flow, a sewage inlet discharging into the inlet portion of said aeration basin, a clarification basin, a conduit for flow from the outlet portion of said aeration basin into said clarification basin, a second conduit leading from said outlet portion to the inlet portion of said aeration basin, a pump in said second conduit, said second conduit and said pump being of such size as to recirculate the contents of the aeration basin in periods of about one hour, a clarified liquid outlet conduit from said clarification basin and a conduit for flow of settled solids from said clarification basin back to the inlet portion of said aeration basin.

15. In combination with a sewage treating plant of the activated sludge type including the old elements of an aeration basin having an inlet for raw sewage and an outlet for treated sewage, means for introducing sludge separated from previously treated sewage to the inlet end of said aeration basin and aerator means for introducing oxygen into sewage undergoing treatment during passage from said inlet to said outlet, the new elements of a return passageway for flow from a point adjacent the said outlet to adjacent the said inlet and means for causing a return flow through said passageway at a rate ranging from about one to about six times the normal hourly rate of inflow.

16. In an activated sludge type sewage plant comprising an aeration basin, said basin having a raw sewage inlet at one end and a treated sewage outlet at the opposite end and aerator means to introduce air into the sewage in the basin during flow thereof from said inlet to said outlet, a sewage clarifier receiving treated sewage from said basin, and means for returning sludge from said clarifier to the inlet end of said basin for admixture with entering sewage: the combination with said aeration basin of means for delivering to the entering sewage an additional controlled amount of sewage solids comprising a conduit opening from adjacent the said outlet end and discharging into said inlet end and a pumping mechanism positioned to cause flow through said conduit, said last mentioned means being of such capacity as to be capable of continuously returning to the inlet end of said basin an amount of freshly aerated sewage ranging from about equal the normal flow of sewage into said basin to about four times such flow.

17. In combination, an aeration basin of an activated sludge sewage treatment plant, said basin having an inlet for raw sewage, and for activated sludge, an outlet for treated sewage and means for introducing oxygen into the sewage during flow thereof from said inlet to said outlet, and means for causing a direct return flow of sewage undergoing treatment from adjacent said outlet to adjacent said inlet in predetermined amount, said means comprising a conduit leading from adjacent said outlet to adjacent said inlet and a pumping mechanism on said conduit, said pumping mechanism having a pumping capacity sufficient to displace the normal volumetric liquid holding capacity of the basin in a period of the order of about one hour.

18. An activated sludge aeration basin of a size sufficient to hold a volume of sewage equal to about three times the average rate of hourly input and having inlet means for sewage and activated sludge at one end thereof, an outlet at the other end thereof, and an aeration means therein characterized by a conduit extending from a point adjacent the outlet end of said basin to a point adjacent the inlet end thereof, and a pumping mechanism positioned to cause a flow of liquid through said conduit from said outlet end towards said inlet end, said conduit and said pumping mechanism being of such size as to displace the volume of the aeration basin in a period of about one hour.

JOHN ALEXANDER LOGAN.

REFERENCES CITED

The following references are of record in the file of this patent:

UNITED STATES PATENTS

| Number | Name | Date |
|---|---|---|
| Re. 15,140 | Jones | July 5, 1921 |
| Re. 22,144 | Ward | July 21, 1942 |
| 978,889 | Imhoff | Dec. 20, 1910 |
| 1,194,933 | Barber | Aug. 15, 1916 |
| 1,282,587 | Jones | Oct. 22, 1918 |
| 1,525,297 | Hartley et al. | Feb. 3, 1925 |
| 1,979,955 | Besselievre | Nov. 6, 1934 |
| 1,999,058 | Raisch | Apr. 23, 1935 |
| 2,029,702 | Buswell et al. | Feb. 4, 1936 |
| 2,048,640 | Sperry | July 21, 1936 |
| 2,090,405 | Shook | Aug. 17, 1937 |
| 2,141,979 | Halvorson et al. | Dec. 27, 1938 |
| 2,154,132 | Mallory | Apr. 11, 1939 |
| 2,167,443 | Bevan | July 25, 1939 |
| 2,200,580 | Pruss et al. | May 14, 1940 |
| 2,225,437 | Nordell | Dec. 17, 1940 |
| 2,228,017 | Pecker | Jan. 7, 1941 |
| 2,270,869 | Ditto et al. | Jan. 27, 1942 |
| 2,283,166 | Buell et al. | May 19, 1942 |
| 2,285,697 | Durdin, 3d | June 9, 1942 |
| 2,317,782 | Levine | Apr. 27, 1943 |
| 2,340,848 | Reybold et al. | Feb. 1, 1944 |
| 2,348,126 | Green | May 2, 1944 |

(Other references on following page)

UNITED STATES PATENTS

| Number | Name | Date |
|---|---|---|
| 2,363,176 | Gunz | Nov. 21, 1944 |
| 2,366,917 | Levine | Jan. 9, 1945 |
| 2,378,756 | Durdin, 3d | June 19, 1945 |
| 2,419,492 | Green | Apr. 22, 1947 |

FOREIGN PATENTS

| Number | Country | Date |
|---|---|---|
| 104,187 | Great Britain | March 1, 1917 |

OTHER REFERENCES

"Modern Sewage Disposal," by Langdon Pearse, editor, 1938, published by the Federation of Sewage Works Association, 654 Madison Ave., New York, N. Y., a copy of which may be found in Division 49. Page 79 is cited.